(12) United States Patent
Diamand et al.

(10) Patent No.: US 11,036,277 B2
(45) Date of Patent: Jun. 15, 2021

(54) METHODS AND APPARATUS TO DYNAMICALLY THROTTLE COMPUTE ENGINES

(71) Applicant: Intel Corporation, Santa Clara, CA (US)

(72) Inventors: Israel Diamand, Aderet (IL); Avital Paz, Kfar Saba (IL); Eran Nevet, HaMishna (IL); Zigi Walter, Haifa (IL)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 16/541,674

(22) Filed: Aug. 15, 2019

(65) Prior Publication Data

US 2019/0369694 A1    Dec. 5, 2019

(51) Int. Cl.
| | | |
|---|---|---|
| *G06F 1/32* | (2019.01) | |
| *G06F 1/08* | (2006.01) | |
| *G06F 1/324* | (2019.01) | |
| *G06F 1/3234* | (2019.01) | |

(52) U.S. Cl.
CPC ............. *G06F 1/324* (2013.01); *G06F 1/08* (2013.01); *G06F 1/3243* (2013.01)

(58) Field of Classification Search
CPC .......... G06G 1/324; G06F 1/3243; G06F 1/08
See application file for complete search history.

(56) References Cited

U.S. PATENT DOCUMENTS

| | | | | |
|---|---|---|---|---|
| 2006/0282685 A1* | 12/2006 | Bahali | ................... | G06F 1/3203 713/300 |
| 2008/0201595 A1* | 8/2008 | Kawasaki | ............. | G06F 1/3203 713/330 |
| 2009/0193276 A1* | 7/2009 | Shetty | ................... | G06F 1/3287 713/340 |
| 2020/0085487 A1* | 3/2020 | Godara | .............. | A61B 18/1206 |

* cited by examiner

*Primary Examiner* — Stefan Stoynov
(74) *Attorney, Agent, or Firm* — Hanley, Flight & Zimmerman

(57) ABSTRACT

Methods and apparatus to dynamically throttle compute engines are disclosed. A disclosed example apparatus includes one or more compute engines to perform calculations, where the one or more compute engines are to cause a total power request to be issued based on the calculations. The example apparatus also includes a power management unit to receive the total power request and respond to the total power request. The apparatus also includes a throttle manager to adjust a throttle speed of at least one of the one or more compute engines based on comparing a minimum of the power request and a granted power to a total used power of the one or more compute engines prior to the power management unit responding to the total power request.

21 Claims, 9 Drawing Sheets

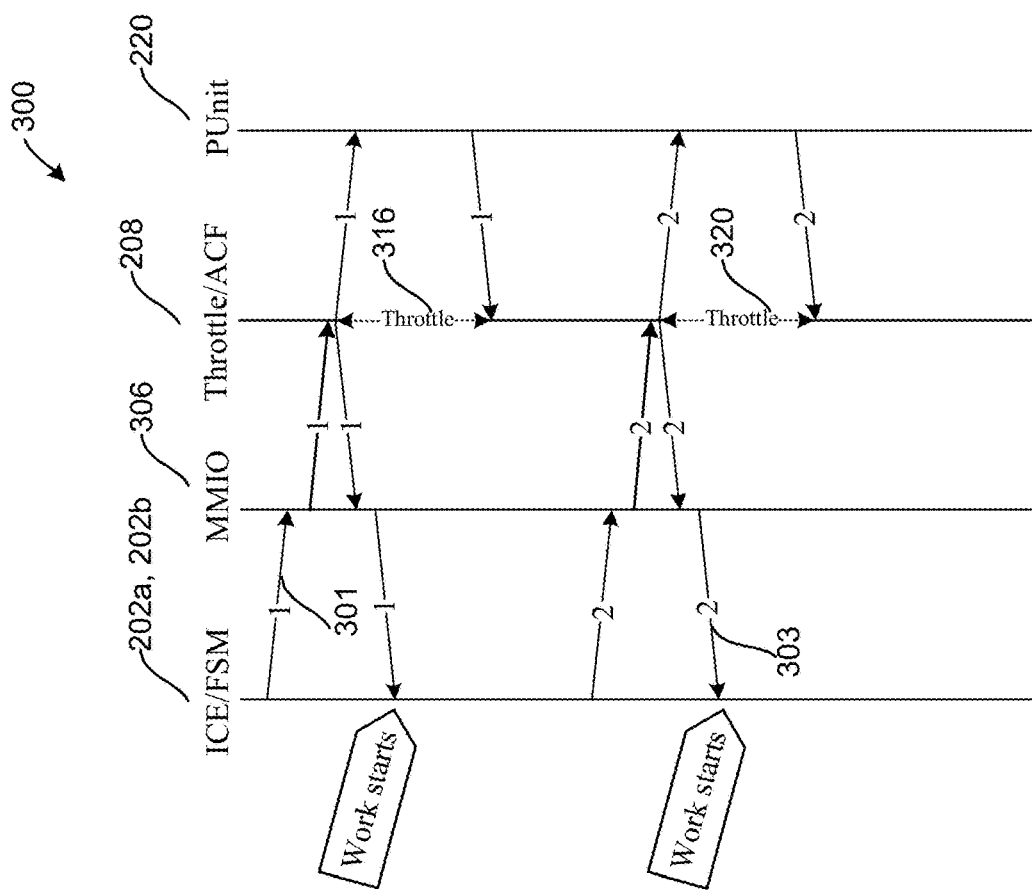
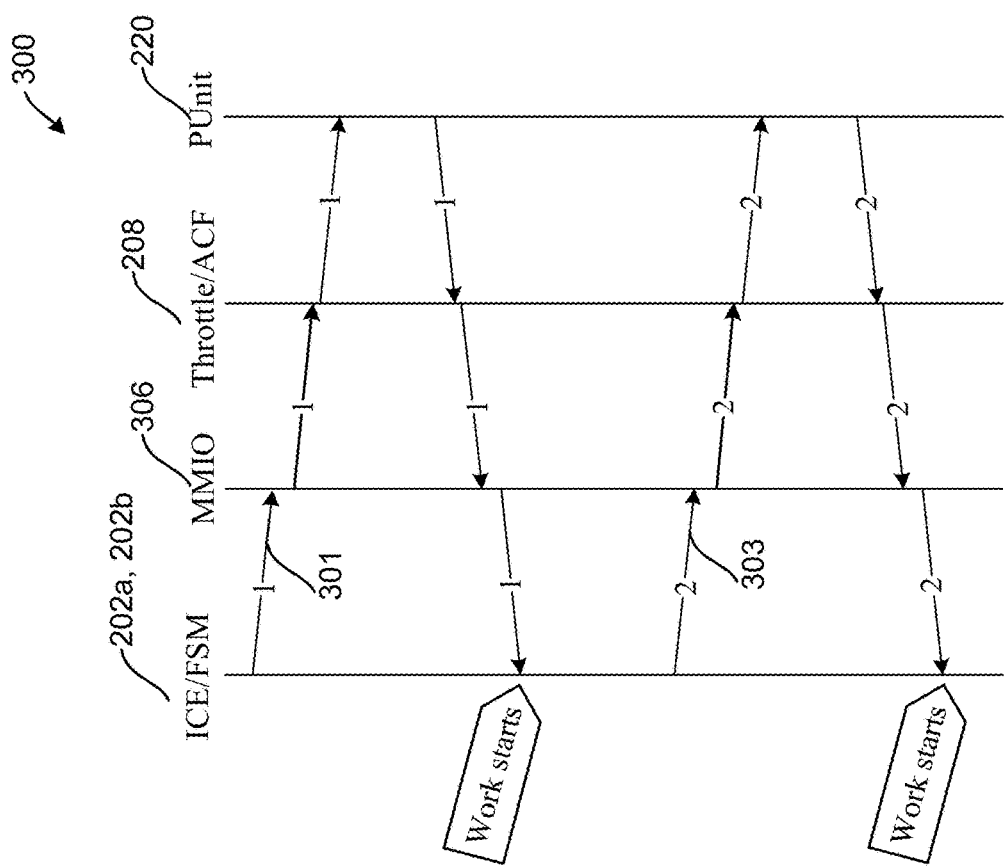
FIG. 3B
FIG. 3A

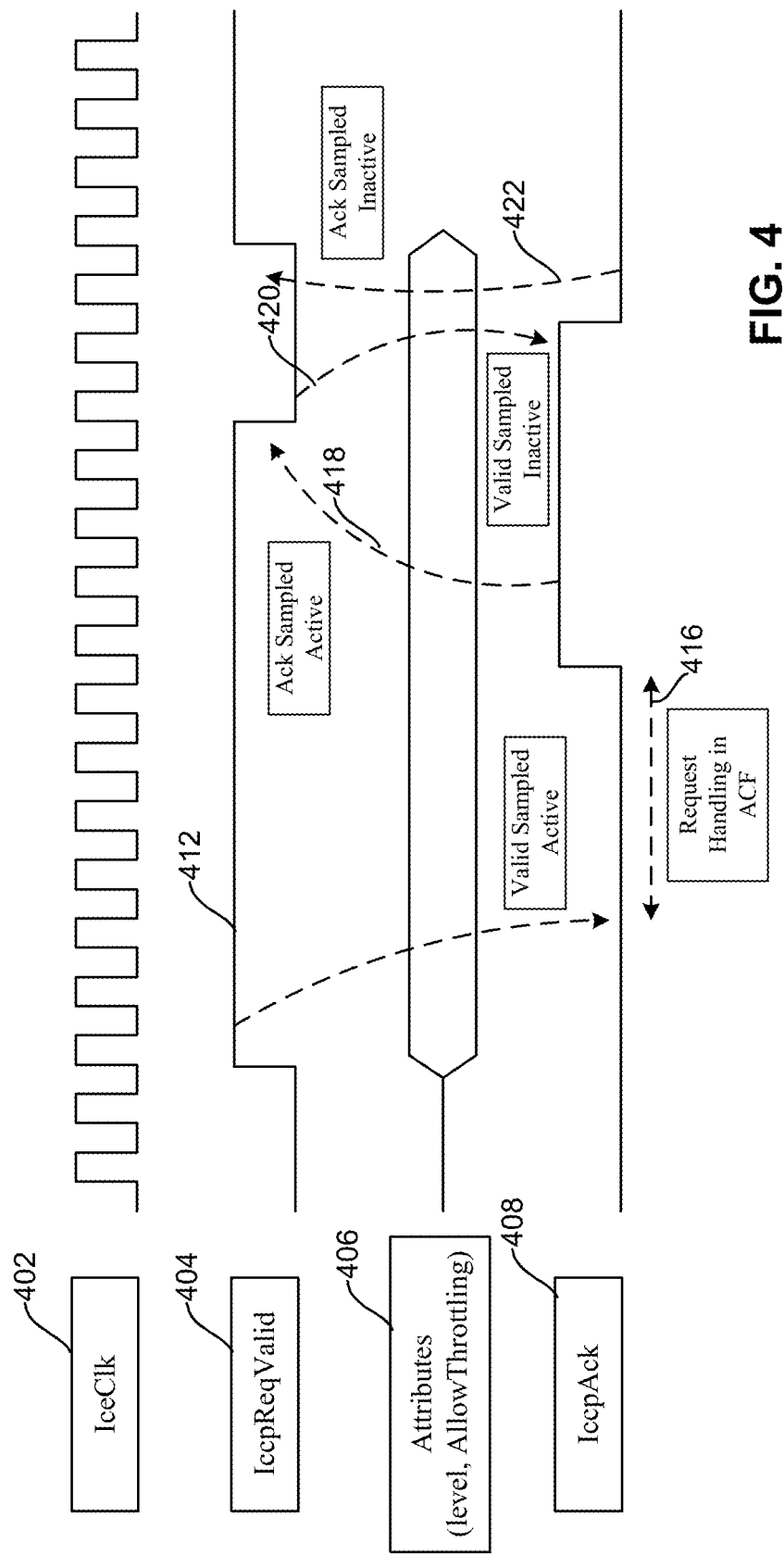

METHODS AND APPARATUS TO DYNAMICALLY THROTTLE COMPUTE ENGINES

FIELD OF THE DISCLOSURE

This disclosure relates generally to compute engine power management, and, more particularly, to methods and apparatus to dynamically throttle compute engines.

BACKGROUND

In recent years, compute engines or cores of associated microprocessors have been employed to perform numerous parallel calculation operations. In particular, these operations can pertain to machine learning and artificial intelligence (AI) applications, and are typically executed on multiple compute engines (i.e., processing cores) as parallel compute threads.

In terms of power needs to perform the aforementioned computations, a compute engine can transmit a power request (e.g., a license request, a power license request) to a power management unit of a microprocessor so that enough current can be furnished to the requesting compute engine. In turn, the power management unit can grant or deny the power request based on a desired power consumption, power availability and/or thermal considerations.

BRIEF DESCRIPTION OF THE DRAWINGS

FIG. 3A illustrates an example implementation without throttling enabled.

FIG. 3B illustrates the example implementation of FIG. 3A with throttling enabled.

FIG. 4 illustrates an example throttling protocol and/or sequence that can be implemented in examples disclosed herein.

The figures are not to scale. Instead, the thickness of the layers or regions may be enlarged in the drawings. In general, the same reference numbers will be used throughout the drawing(s) and accompanying written description to refer to the same or like parts.

Figure 1:
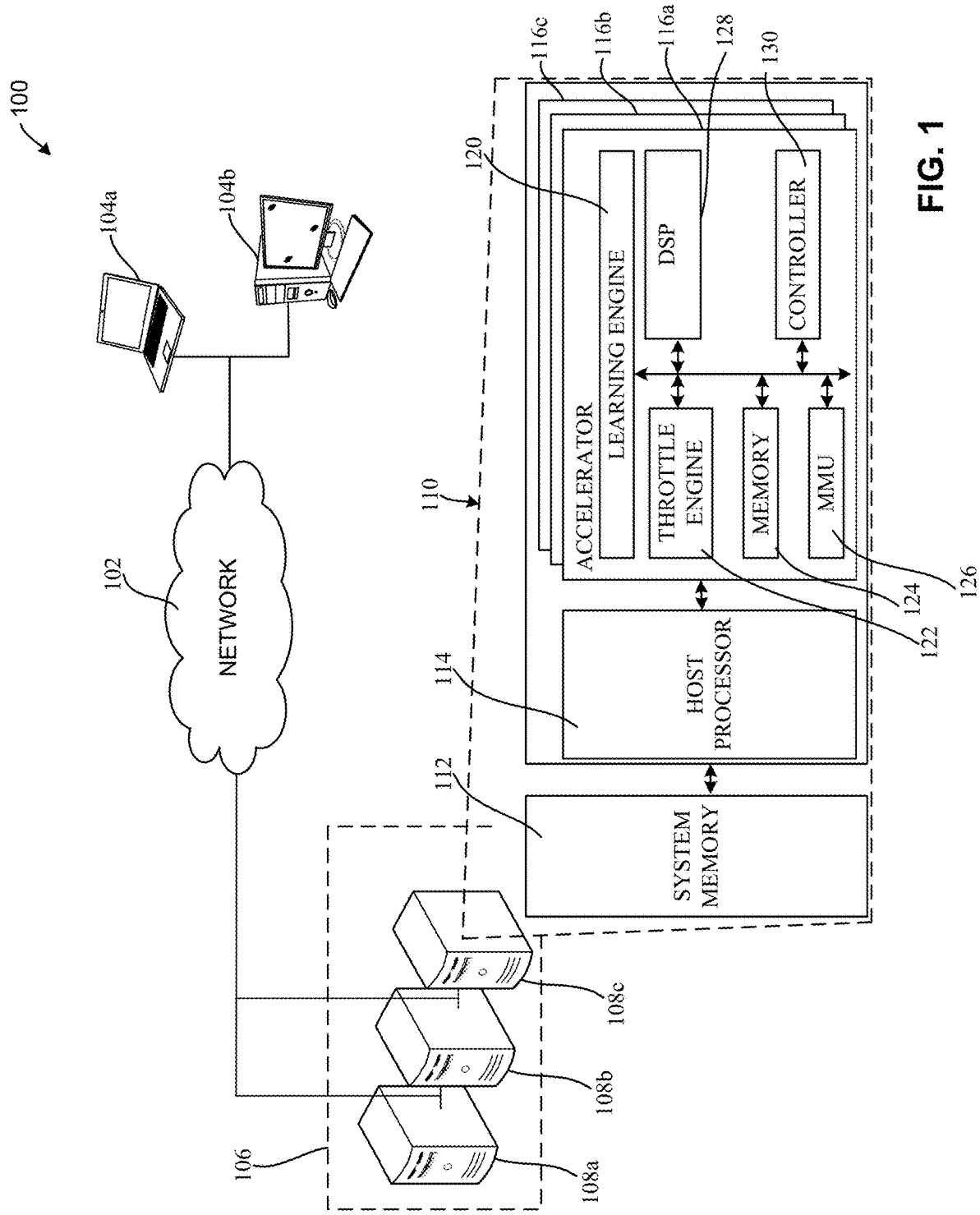
FIG. 1 is a schematic illustration of an example distributed computation system in which examples disclosed herein can be implemented.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Methods and apparatus to dynamically throttle compute engines are disclosed. In some known systems, for a compute engine or processing core of a microprocessor (e.g., a central processing unit (CPU)) to perform computations, the compute engine transmits a license power request to a power management unit of the microprocessor for enough current to be provided to the compute engine. In response, the power management unit can grant or deny the power request based on a desired power consumption, power availability and/or thermal considerations. Accordingly, the process to transmit, receive, process and disposition the power request can involve a relatively long time period. As a result of this relatively long period, the compute engine can be subject to excess power consumption and/or undesired thermal activity.

Examples disclosed herein enable relatively quick throttling of microprocessor compute engines (e.g., artificial intelligence compute engines, compute cores), thereby enabling effective power management, current protection, as well as thermal performance controls. The throttling can be performed while a power request (e.g., a license power request) provided to a power management unit is being processed. As a result, the corresponding compute engines can be throttled before a license request response is transmitted back to a requesting compute engine (e.g., concurrently with the power request being processed). In other words, examples disclosed herein enable dynamic throttling of compute engines and can, thus, improve overall microprocessor performance and reliability by allowing compute cores/engines to be throttled independently of a power request review process. Examples disclosed herein can also enable current protection of the compute engines by preventing an excess amount of current to be provided thereto.

According to examples disclosed herein, a power level calculator calculates a total power request corresponding to one or multiple compute engines. In turn, the total power request is provided to the aforementioned power management unit so that the power management unit can approve or deny the total power request. Prior to the power management unit responding to the power request, a throttle manager throttles the compute engine(s) for a desired level of power usage based on a comparison of a minimum of the power request and a granted power level (e.g., a previously granted power level by the power management unit) to a total used power of the compute engine(s) so that corresponding clock speeds of the compute engine(s) can be quickly adjusted to avoid malfunctions and/or improper operation. Further, in examples with multiple compute engines, the compute engines can be throttled simultaneously (e.g., to the same power level) to more accurately control the compute engines in an overall sense.

In some examples, throttling of the compute engine(s) is prevented if the power request is less than or equal to the granted power level (e.g., a minimum or maximum previous granted power level). In some examples, the power level calculator calculates the power request based on individual power requirements of the compute engine(s). In some examples, the compute engine(s) are throttled based on a throttle ratio that is calculated by dividing the granted power level with the power request. Additionally or alternatively, a hysteresis mechanism, device and/or analysis is used to determine whether to forward the power request to the power management unit based on a degree of similarity between the power request and prior granted power level(s).

As used herein, the terms "compute engine" and "inference compute engine" refer to a computer processing core and/or a computing engine core, which may be part of a multicore processor, a multi-processor system and/or a distributed computation system. As used herein, the terms "power request," "total power request," "power license" and "power license request" refer to a request for a provided current and/or power for a respective compute engine, a processor, a multicore processor and/or a processing core. As used herein, the terms "granted power level" and "granted power" refer to an approved power configuration that can be defined by a value, a range and/or a representation (e.g., a power level number, a power level indicator, etc.).

FIG. 1 is a schematic illustration of an example distributed computation system 100 in which examples disclosed herein can be implemented. The distributed computation system 100 of the illustrated example includes an example network 102, which is communicatively coupled to example workstations 104 (hereinafter 104a, 104b, etc.). Further, the example network 102 is communicatively coupled to a computational node 106 which, in turn, includes multiple example servers 108 (hereinafter 108a, 108b, 108c, etc.). In this example, the servers 108a, 108b, 108c each include at least one computing portion (e.g., a computational motherboard, a modular computation unit, a computation section, etc.) 110. The computing portion 110 can be implemented as a processor node, a board, a motherboard, a wired circuit, etc. of the respective server 108.

The computing portion 110 of the illustrated example includes system memory 112, a host processor 114, and at least one accelerator (e.g., an accelerator board, a modular accelerator board, an accelerator section, etc.) 116 (hereinafter 116a.116b, 116c, etc.). In this example, each of the accelerators 116 includes a learning engine 120, a throttle engine 122, memory (e.g., local memory) 124, a memory management unit (MMU) 126, a digital signal processor (DSP) 128 and a controller (e.g., a local controller) 130. The example hardware and network topology is only an example and any appropriate hardware and network topology can be implemented instead.

In operation, the example accelerators 116a, 116b, 116c are implemented for handing computational tasks related to artificial intelligence (AI) applications (e.g., machine learning, deep learning, neural networks, deep neural networks, recurrent neural networks, etc.). However, the accelerators 116a, 116b, 116c can be implemented for any other appropriate computational tasks. In the illustrated example, the host processor 114 utilizes the system memory 112 to manage or direct use of the accelerators 116a, 116b, 116c. In particular, the host processor 114 manages computational tasks to be performed by each of the accelerators 116a, 116b, 116c. In particular, the host processor 114 assigns, offloads and/or forwards computational tasks to ones of the accelerators 116a, 116b, 116c based on workload distribution directives.

To perform the aforementioned computational tasks such as multilayered machine learning, etc., the accelerators 116a, 116b, 116c include the learning engine 120. In the illustrated example, the throttle engine 122 controls speeds (e.g., clock speeds, etc.) of computational cores of the learning engine 120. In this example, the memory 124 is managed by the MMU 126 and utilized by multiple components/devices of the corresponding accelerator 116. Further, the example DSP 128 is used to process signals, such as operations that coincide with the learning engine 120 and/or any other appropriate signal processing (e.g., filtering signals, measuring signals, compressing signals, etc.) to be performed by the accelerator 116. In this example, the controller 130 coordinates tasks between the host processor 114, the learning engine 120, the throttle engine 122 and/or the MMU 126. However, any other appropriate hardware architecture can be employed instead.

Figure 2:
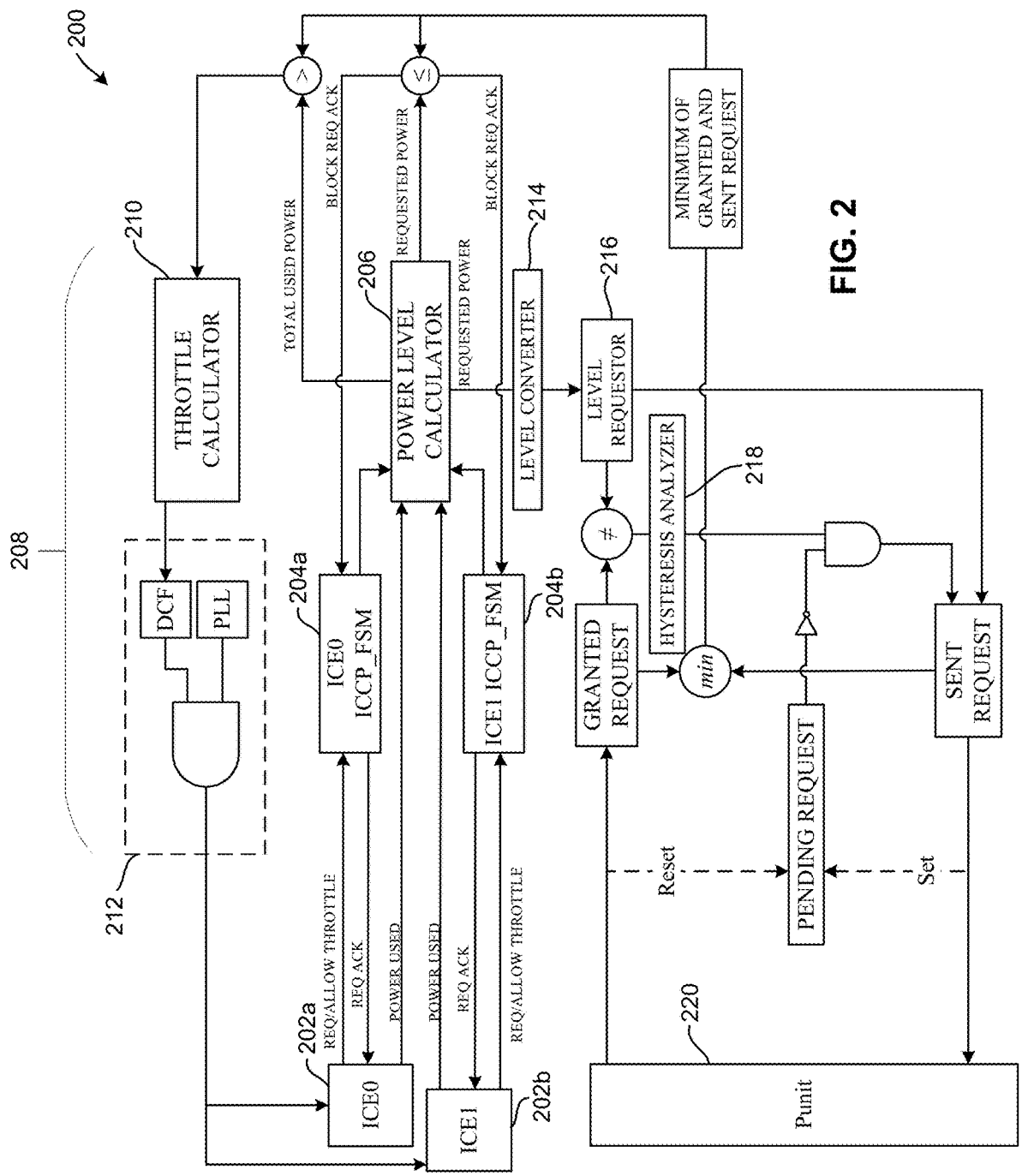
FIG. 2 illustrates an example throttling system in accordance with teachings of this disclosure.

FIG. 2 illustrates an example throttling system 200 in accordance with teachings of this disclosure. The example throttling system 200 can be implemented in the computing portion 110, the learning engine 120, the throttle engine 122 and/or the accelerators 116a, 116b, 116c of FIG. 1. The throttling system 200 of the illustrated example includes inference compute engines (ICEs) 202 (hereinafter 202a, 202b, etc.), which are designated as "ICE0" and "ICE1" in FIG. 1. In particular, the ICEs 202a, 202b of the illustrated example have respective clock speeds that are managed and dynamically adjusted by examples disclosed herein. The example throttling system 200 also includes ICE interfaces (e.g., front-side module (FSM), ICE throttle controllers, etc.) 204 (hereinafter 204a, 204b, etc.), which correspond to the respective ICEs 202a, 202b. Further, the throttling system 200 includes a power level calculator 206, and a throttle adjuster (e.g., an accelerator on coherent fabric (ACF)) 208. The example throttle adjuster 208 includes a throttle calculator 210 and a throttle controller 212, which includes a dynamic clock frequency (DCF) and phased-lock loop (PLL) clock. The throttling system 200 also includes a power level converter 214, a level requester 216, a hysteresis analyzer 218 and a power management unit 220, which is designated as "Punit" in FIG. 2.

To perform calculations and/or computations, the ICEs 202a, 202b of the illustrated example are provided power from a power source. The power provided from the power source to the ICEs 202a, 202b is managed and/or regulated by the power management unit 220 to prevent damage and reduce excess power usage. In this example, the ICEs 202a, 202b are implemented as computing cores (e.g., cores of a multi-core processor and/or system) and draw current as they perform multi-threaded calculations. More particularly, the ICEs 202a, 202b of the illustrated example are implemented as deep learning computing cores for artificial intelligence (AI) accelerators and work in tandem together. However, the ICEs 202a, 202b can be implemented for any appropriate application, which may be related or unrelated to machine learning.

To interface the ICEs 202a, 202b with the power management unit 220, the respective interfaces 204a, 204b, provide and/or define a communication pathway therebetween. In the illustrated example, the interfaces 204a, 204b generate, forward and/or format data associated with power requests from the individual ICEs 202a, 202b to the power management unit 220. In this example, the interfaces 204a, 204b provide first and second power requests (e.g., power license requests) to the power level calculator 206.

To calculate a combined total power request of the ICEs 202a, 202b, the power level calculator 206 of the illustrated example receives first and second power requests from the ICEs 202a, 202b, respectively, and, in turn, calculates an aggregate total power request (e.g., a summed power request, etc.) based on the first and second power requests. In some examples, the first and second power requests are summed. Alternatively, the first and second power requests are summed as power levels (e.g., integer-based power levels, etc.). In this example, the power level calculator 206 calculates the aforementioned total power request based on receiving the first and second power requests within a pre-defined time period. In other words, the power level calculator 206 calculates the total power request when the first and second power requests are received within the pre-defined time period and/or within a requisite time differential of one another. In some other examples, the first and second power requests are weighted and the total power request is calculated based on different weighting of the ICEs 202a, 202b. The weighting may be based on priority of the ICEs 202a, 202b and/or priorities associated with computing tasks to be performed.

In this example, the power level calculator 206 also determines a total power usage (e.g., current power usage, an instantaneous power usage, a current power dissipation or draw, etc.) of the ICEs 202a, 202b. In the illustrated example, the total power usage represents a current instantaneous power draw and/or a power draw within a requisite time period (e.g., within a pre-defined time period or sampling period, instantaneously). In some examples, the power level calculator 206 calculates the total power usage and/or the total power request in terms of a dynamic capacitance (Cdyn), which is a representation of an amount and/or size of hardware currently utilized by the ICEs 202a, 202b and/or the accelerator 116, for example.

In the illustrated example, to convert the total power request into a single request, power level and/or power value (e.g., a numerical power setting), the example level converter 214 converts the total power request from the power level calculator 206 into a requested power level (e.g., an integer power level, a power representation, a power range representation, etc.). In examples where the total power request is represented by a power level, the power level may encompass a power range, which may be linear or non-linear. In some examples, the total power request is forwarded as a dynamic capacitance (Cdyn) level or value. Additionally or alternatively, tables are used by the level converter 214 such that a table lookup can be performed to convert power values or ranges to power levels, and vice-versa, as shown below in connection with FIGS. 7 and 8.

In some examples, the level requester 216 forwards the requested power level to the power management unit 220. In some such examples, the requested power level is forwarded to the power management unit 220 as an integer value and/or an integer that represents a power output and/or a power output mode of at least one of the ICEs 202a, 202b. In some examples, the requested power level is not sent if the requested level is the same as or less than the granted power level.

To calculate a degree to which to adjust one or more clock speeds of the ICEs 202a, 202b while a power request from the ICEs 202a, 202b is being forwarded to or processed by the power management unit 220, the throttle calculator 210 of the illustrated example determines whether a total amount of power utilized by the ICEs 202a, 202b exceeds an amount of power (e.g., a maximum amount of power) previously granted by the power management unit 220. Additionally or alternatively, the power request is compared to the total amount of power utilized by the ICEs 202a, 202b. In this example, if the total amount of power used by the ICEs 202a, 202b exceeds a minimum of the previously granted power and the requested power, the ICEs 202a, 202b are throttled based on a throttle ratio. For example, this throttle ratio can indicate a percentage and/or ratio of a maximum clock speed (e.g., 0.2, 0.50, 0.75, 1.0, etc. of the maximum clock speed or highest designated clock speed) of the ICEs 202a, 202b. In some examples, the throttle ratio is calculated by dividing the maximum allowed power by the total amount of power used by the ICEs 202a, 202b. However, any appropriate calculation and/or adjustment methodology can be implemented instead. In some examples, the throttle calculator 210 receives an allowed dynamic capacitance (e.g., a maximum allowed dynamic capacitance) that is utilized to define a degree to which the ICEs 202a, 202b are to be throttled.

In the illustrated example, the throttle controller 212 controls a clock speed of the ICEs 202a, 202b. In particular, the example throttle controller 212 directs throttling of both of the ICEs 202a, 202b in tandem (e.g., simultaneously) by providing a single clock speed instruction/command (e.g., a speed command, a throttle command, etc.) to both of the ICEs 202a, 202b which, in turn, adjust their respective clock speeds accordingly. In other words, the ICEs 202a, 202b are directed and/or commanded to the same clock speed and/or throttle ratio, in this example. However, in some other examples, the throttle controller 212 controls clock speeds of the ICEs 202a, 202b to different values.

In some examples, a hysteresis analyzer 218 is used to analyze and/or verify a difference between the power request and a previously granted power level (e.g., granted power value range, granted power value, etc.) issued by the power management unit 220. In particular, the hysteresis analyzer 218 may be used to determine if a relatively recent power request from the level requester 216 is sufficiently close (e.g., lower than) the granted power level such that the power request does not need to be forwarded to the power management unit 220. As a result, the example hysteresis analyzer 218 can delay or prevent sending power request(s) to the power management unit 220 until the power request(s) are stable for a desired amount of time. While two of the ICEs 202 are shown in the example of FIG. 2, any appropriate number of the ICEs 202 can be implemented instead (e.g., one, three, five, ten, fifty, one hundred, etc.).

FIG. 3A illustrates an implementation 300 in which power requests (e.g., power license requests) are sent to the power management unit 220 while the throttle adjuster 208 is disabled or prevented from throttling one or more of the ICEs 202a, 202b, in this example. In this example, the throttle adjuster 208 is prevented and/or block from throttling the ICEs 202a, 202b when a power request is determined to be less than a threshold by the power level calculator 206 and/or the throttle calculator 210. As can be seen in the illustrated view of FIG. 3A, the ICEs 202a, 202b are communicatively coupled to the power management unit 220 and request provided power therefrom. In particular, the license requests (e.g., power requests, power license requests, etc.) 301, 303, which may each correspond to ones of the ICEs 202a, 202b, are forwarded to the power management unit 220 via an intermediary 306 (e.g., an intermediate circuit, an intermediate discrete component, memory-mapped I/O (MMIO), etc.) and the throttle adjuster 208. In this example, the intermediary 306 and the throttle adjuster 208 define a communication and/or authorization pathway between the ICEs 202a, 202b and the power management unit 220.

As mentioned above, the ICEs 202a, 202b transmit a power request (e.g., a total power request) to the power management unit 220 via a communication pathway defined by the intermediary 306 and the throttle adjuster 208. In turn, the power management unit 220 approves or denies the power request via the communication pathway. Accordingly, when the power management unit 220 approves the power request, the approval (e.g., approval message, permission(s), license, etc.) is then transmitted back to the ICEs 202a, 202b via the intermediary 306 and the throttle adjuster 208. Because of the communication pathway back and forth therebetween and potential processing time of the power management unit 220, the time to process the power request can be significant.

FIG. 3B illustrates the example implementation 300 when throttling in accordance with teachings of this disclosure has been enabled. In the illustrated example, the ICEs 202a, 202b, the power management unit 220, the intermediary 306 and the throttle adjuster 208 are shown.

In operation, the ICEs 202a, 202b provide a combined power request to the power management unit 220. In particular, the power request is approved or denied by the power management unit 220. Similar to the example configuration shown in FIG. 3A, the power management unit 220 communicates an approval or denial of the power requests 301, 303 to the ICEs 202a, 202b. In this example, however, while the power requests 301, 303 are being transmitted and/or processed by the power management unit 220, the throttle adjuster 208 throttles the ICEs 202a, 202b, as generally indicated by arrows 316, 320, thereby enabling a relatively quick adjustment of the ICEs 202a, 202b while the power request is being processed for approval by the power management unit 220. As a result, the clock speeds of the ICEs 202a, 202b can be adjusted faster than the time required for the power management unit 220 to process the power request and return a response to the ICEs 202a, 202b. In other words, the ICEs 202a, 202b are dynamically throttled by the throttle adjuster 208.

FIG. 4 illustrates an example throttling protocol and/or sequence that can be implemented in examples disclosed herein. In the illustrated example, a first plot 402 represents clock pulses of the ICE 202, a second plot 404 represents a validation signal, a third plot 406 represents adjustments (e.g., throttling enablement, power level adjustments, etc.) of the ICE 202 and a fourth plot 408 represents a signal indicating power request handling by the throttle adjuster 208 for the ICE 202.

In operation, once a power request from the ICE 202 is validated, as generally indicated by a signal 412, the throttle adjuster 208 of the illustrated example is requested to handle the power request, as generally indicated by a double arrow 416. Further, the power request is verified to be validated and active so that the throttle adjuster 208 can adjust the clock speed of the ICE 202 while the signal 412 is active, as generally indicated by an arrow 418. Once the signal 412 is inactive, the throttle adjuster 208 ceases throttling the ICE 202, as generally indicated by an arrow 420. Further, an arrow 422 of the illustrated example indicates inactive throttling by the throttle adjuster 208 until the signal 412 is made active and throttling by the throttle adjuster 208 has been requested.

While an example manner of implementing the throttling system 200 of FIG. 2 is illustrated in FIG. 2, one or more of the elements, processes and/or devices illustrated in FIG. 2 may be combined, divided, re-arranged, omitted, eliminated and/or implemented in any other way. Further, the example power level calculator 206, the example throttle calculator 210, the example throttle controller 212, the example power level converter 214, the example level requester 216, the example power management unit 220 and/or, more generally, the example throttling system 200 of FIG. 2 may be implemented by hardware, software, firmware and/or any combination of hardware, software and/or firmware. Thus, for example, any of the example power level calculator 206, the example throttle calculator 210, the example throttle controller 212, the example power level converter 214, the example level requester 216, the example power management unit 220 and/or, more generally, the example throttling system 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device (s) (FPLD(s)). When reading any of the apparatus or system claims of this patent to cover a purely software and/or firmware implementation, at least one of the example, power level calculator 206, the example throttle calculator 210, the example throttle controller 212, the example power level converter 214, the example level requester 216, and/or the example power management unit 220 is/are hereby expressly defined to include a non-transitory computer readable storage device or storage disk such as a memory, a digital versatile disk (DVD), a compact disk (CD), a Blu-ray disk, etc. including the software and/or firmware. Further still, the example throttling system 200 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
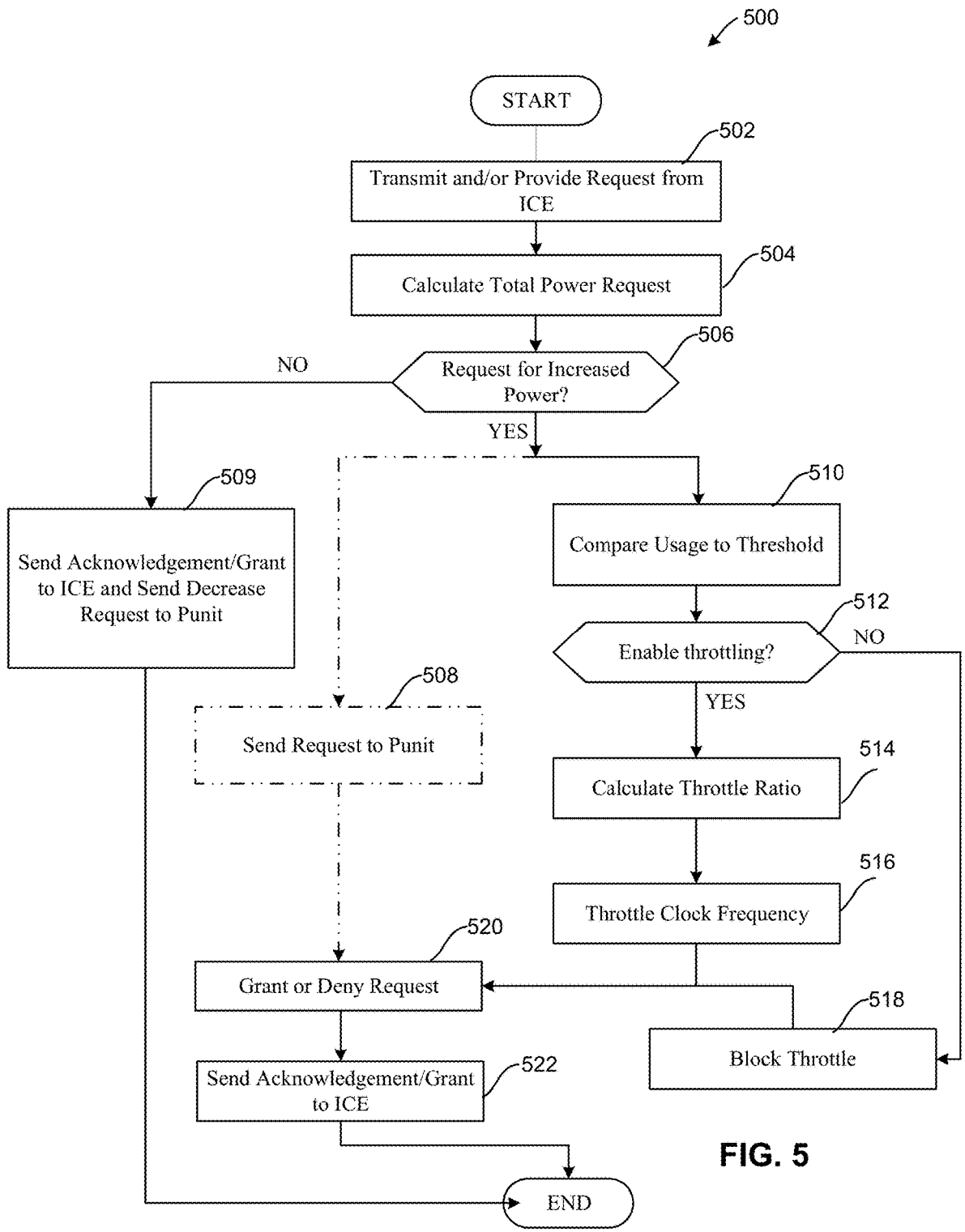
FIG. 5 is a flowchart representative of machine readable instructions which may be executed to implement the example throttling system of FIG. 2.

A flowchart representative of example hardware logic, machine readable instructions, hardware implemented state machines, and/or any combination thereof for implementing the throttling system 200 of FIG. 2 is shown in FIG. 5. The machine readable instructions may be one or more executable programs or portion(s) of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 5, many other methods of implementing the example throttling system 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK)), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example method 500 of FIG. 5 begins as the ICEs 202a, 202b are being operated to perform calculations (e.g., machine learning calculations, etc.). In particular, the ICEs 202a, 202b are requesting power needed for the aforementioned calculations from the power management unit 220 via the interfaces 204a, 204b. However, the throttle adjuster 208 is implemented to ensure that power usage of the ICEs 202a, 202b does not exceed power budgets and/or desired power usage. Additionally or alternatively, the throttle adjuster 208 is operated to maintain temperatures of the ICEs 202a, 202b to prevent damage and/or excess wear thereto.

At block 502, in the illustrated example, the ICEs 202a, 202b transmit and/or provide a power request to the interfaces 204a, 204b. In this particular example, the ICEs 202a, 202b each provide individual power requests to the respective interfaces 204a, 204b. The power requests from each of the ICEs 202a, 202b may be different or the same. In some other examples, only a single power request from one of the ICEs 202a 202b is provided to one of the corresponding interfaces 204a, 204b.

At block 504, the power level calculator 206 of the illustrated example calculates and/or determines a total power request (e.g., a total power level request, a summed power level request, an aggregate power request, etc.) based on the power requests received from each of the ICEs 202a, 202b. Further, the example power level calculator 206 also calculates a total power usage and/or a total power usage level of the ICEs 202a, 202b.

At block 506, the example power level calculator 206 determines whether the power request is related to an increase in power and/or power usage. If the power request is related to a power increase (block 506), control of the process proceeds to blocks 508, 510. Otherwise, the process returns to block 509. In some other examples, additionally or alternatively, the power level calculator 206 analyzes the power request to a threshold (e.g., below a maximum power threshold, etc.) to make this determination.

At block 509, when the power request is not related to an increase in power, an acknowledgement/grant is sent to the ICEs 202a, 202b and, in parallel, the power request is forwarded to the power management unit 220. For example, the power management unit 220 can utilize this acknowledgment/grant for managing the power and/or an overall power budget of multiple ones of the ICEs 202a, 202b. In turn, the process ends.

At block 508, the power request is sent to the power management unit 220 via the level requester 216. In some examples, a hysteresis analysis is performed by the hysteresis analyzer 218 prior the power request being forwarded to the power management unit 220. In the illustrated view of FIG. 5, a path associated with block 508 is depicted as dotted lines to illustrate that certain operations of the example method 500 can be performed in parallel and/or simultaneously.

At block 510, a threshold defined as a minimum of a granted power level from the power management unit 220 (e.g., a previous power grant by the power management unit 220) and the power request is compared to a power level usage (e.g., combined and/or total power usage) of the ICEs 202a, 202b. However, any other appropriate threshold can be analyzed instead.

At block 512, the throttle calculator 210 of the illustrated example determines whether to enable throttling. In this example, the throttle calculator 210 makes this determination based on comparing the threshold, which is defined as the minimum of the last power grant and the requested power, to the current power usage. In particular, when the power level usage is greater than the aforementioned threshold, throttling is enabled and the process proceeds to block 514. Otherwise, if the power level usage is less than or equal to the threshold, control of the process proceeds to block 518. In some examples, the threshold is defined in the form of a maximum dynamic capacitance. However, any other appropriate methodology, comparison and/or determination can be implemented instead.

At block 514, the example throttle calculator 210 calculates a throttle ratio. For example, the throttle ratio can be calculated using by dividing the granted power (e.g., the maximum granted power, maximum allowed Cdyn, maximum allowed power level, etc.) over the total used power of the ICEs 202a, 202b. Additionally or alternatively, the throttle ratio is rounded to $$\frac{1}{2^n},$$

where n is defined based on subtracting a highest bit set of the maximum allowed power (B) from a highest bit set of the total used power (A) such that n=A-B, for example.

At block 516, the throttle controller 212 adjusts the clock speed of the ICEs 202a, 202b. In the illustrated example, the throttle controller 212 utilizes the aforementioned throttle ratio to adjust respective clock speeds of the ICEs 202a, 202b.

At block 518, the ICEs 202a, 202b are blocked and/or prevented from throttling by the power level calculator 206 and/or the throttle calculator 210. Additionally or alternatively, the power request is blocked. In some examples, a blocked request acknowledgment message is transmitted to the ICEs 202a, 202b.

At block 520 the power management unit 220 transmits a power grant or denial to the ICEs 202a, 202b and/or the interfaces 204a, 204b. In some examples, the power management unit 220 can delay the grant until desired operations are performed to reduce power consumption(s) of other system components, or alternatively, until the power management unit 220 will have the desired operations performed and/or completed, which can increase an overall allowed power consumption of the system.

At block 522, the power management unit 220 returns an acknowledgement (ACK) message to the ICEs 202a, 202b via the interfaces 204a, 204b and the process ends.

Figure 6:
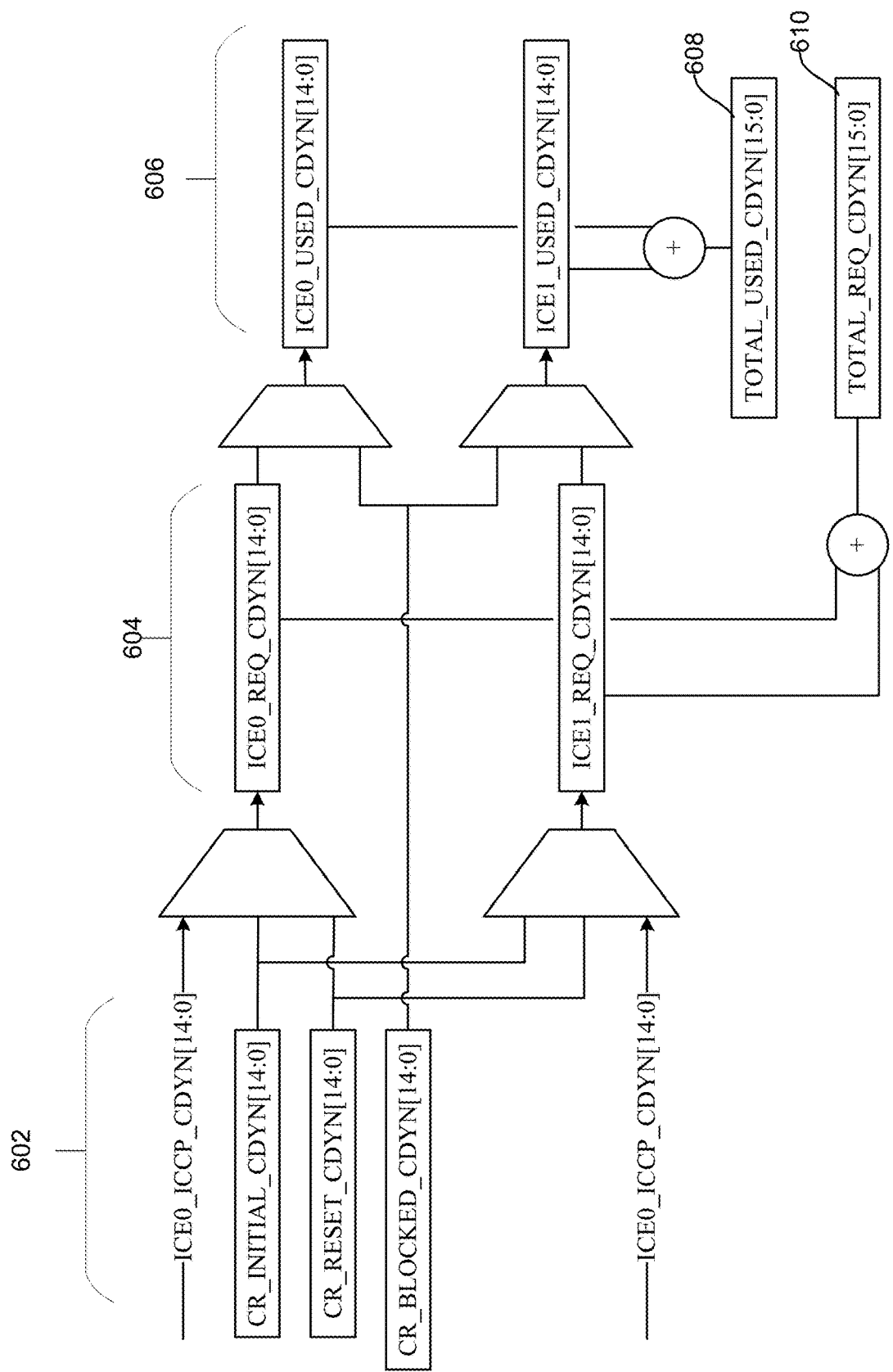
FIG. 6 illustrates operation of an example power level calculator of the throttling system of FIG. 2.

FIG. 6 illustrates operation of the example power level calculator 206 to calculate a total power request and usage associated with the ICEs 202a, 202b. In the illustrated example, inputs 602 are summed and/or combined to define power requests/requirements 604 of the ICEs 202a, 202b. Further, the example power level calculator 206 determines an amount of used power (e.g., currently used power) 606 of the ICEs 202a, 202b. In turn, a total used power (e.g., Cdyn) 608 and a total requested power 610 is transmitted as output from the example power level calculator 206.

Figure 7:
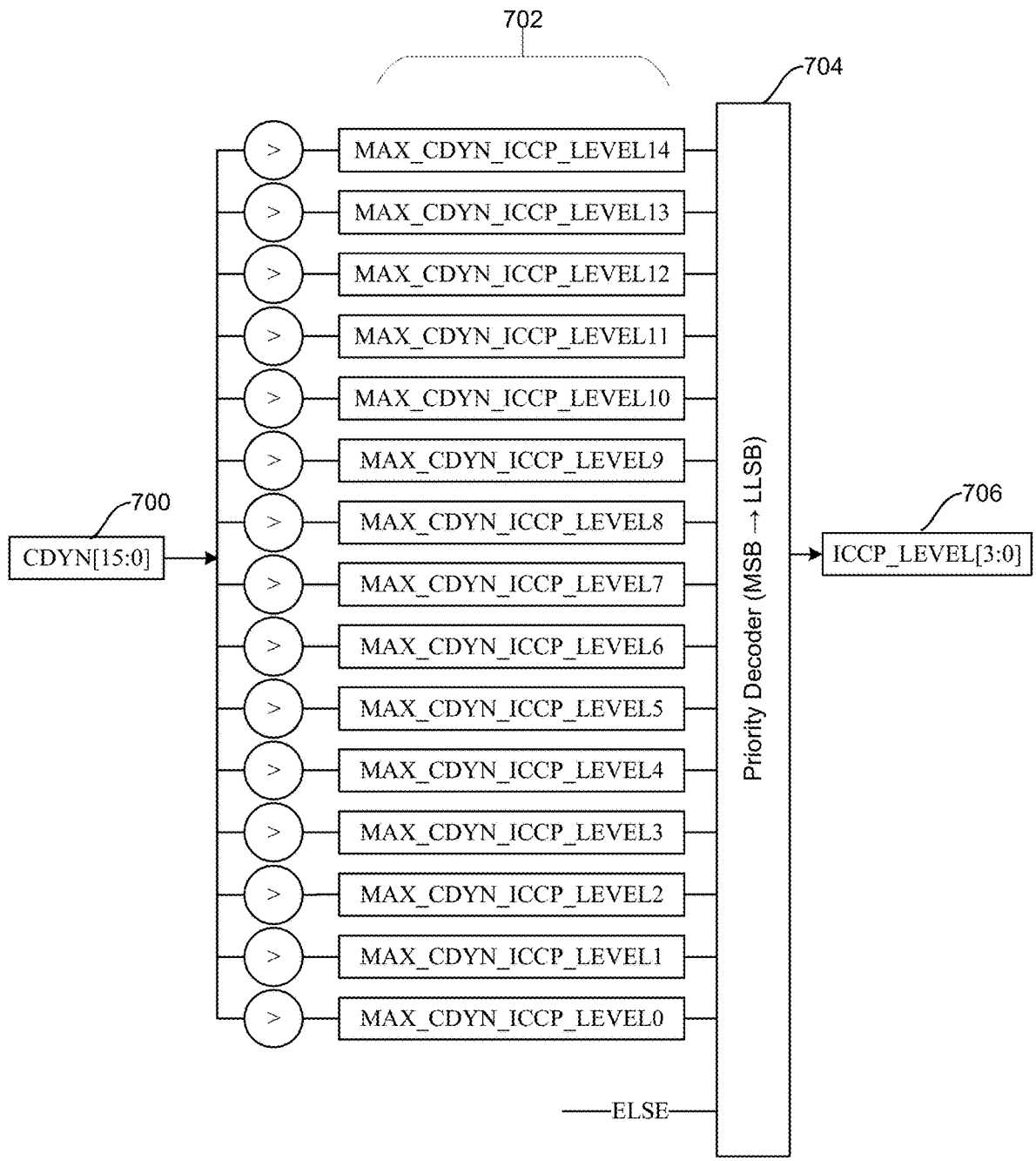
FIG. 7 illustrates a schematic overview of a power level conversion that can be implemented in examples disclosed herein.

FIG. 7 illustrates a schematic overview of a power level conversion that can be implemented in examples disclosed herein. In particular, the example of FIG. 7 illustrates how requested power levels can be converted into levels. In the illustrated example, the level converter 214 and/or the power level calculator 206 can convert power request values 700 into designated power levels 702. The example power levels 702 can be represented by integers that indicate power value ranges and/or pre-defined power increments. In the illustrated example a block 704 represents a decoder that outputs a power level (e.g., a power level value, a power level representation) 706 pertinent to operation of the ICEs 202a, 202b. In this example, the power levels 702 are organized and/or accessed as a lookup table so that dynamic capacitance can be translated to and from power levels.

Figure 8:
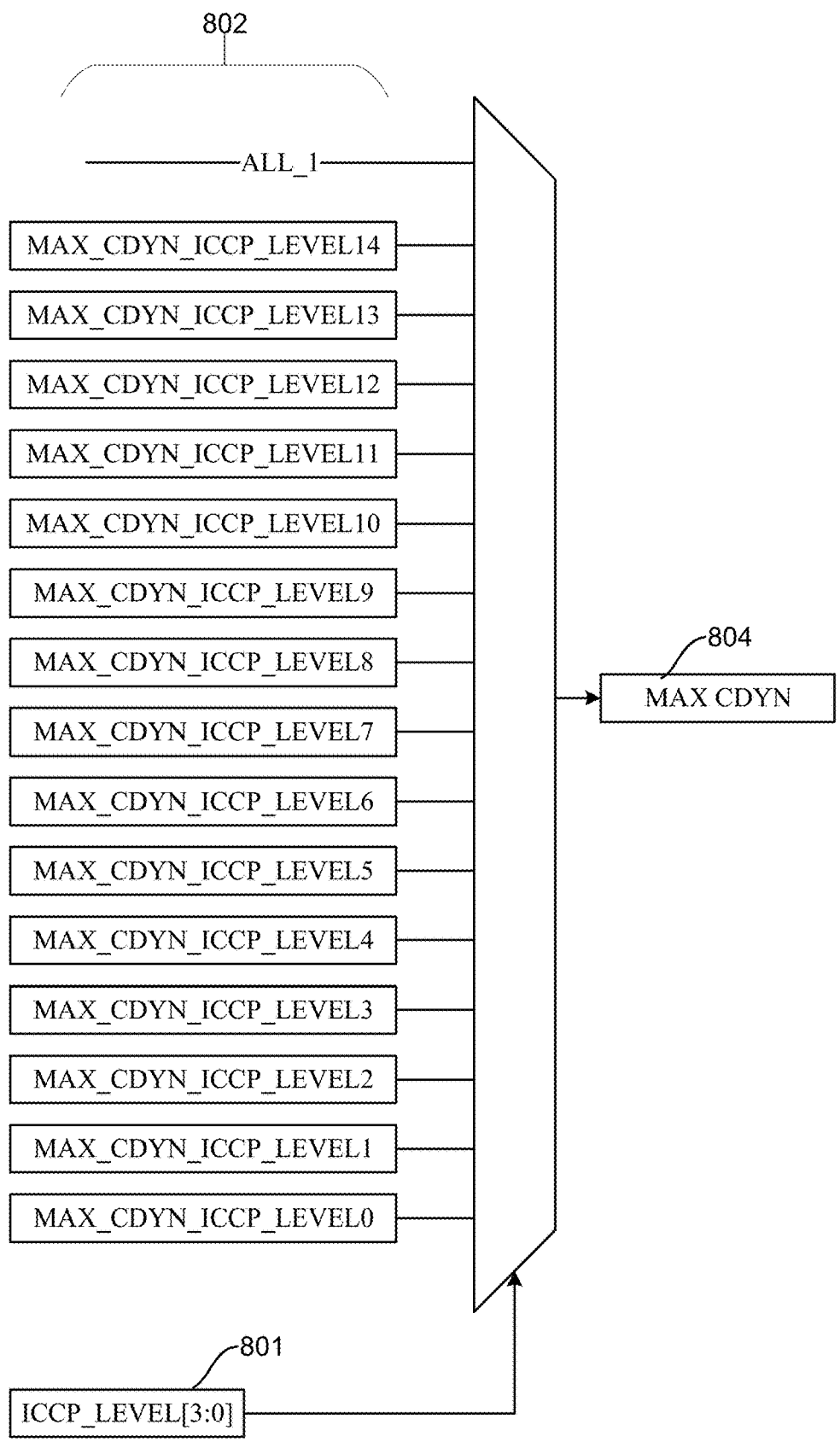
FIG. 8 illustrates an example process of converting a power to a representation of power.

Turning to FIG. 8, an example process is illustrated in which a power (e.g., a power value) is converted to a power representation (e.g., a power level, a power index, etc.). The power representation can be represented as a maximum dynamic capacitance (Max_Cdyn), for example. In the illustrated view of FIG. 8, the granted power 801 is provided to a block 802 and, in turn, converted into a power level (e.g., a power representation, a power range representation, etc.) 804.

Figure 9:
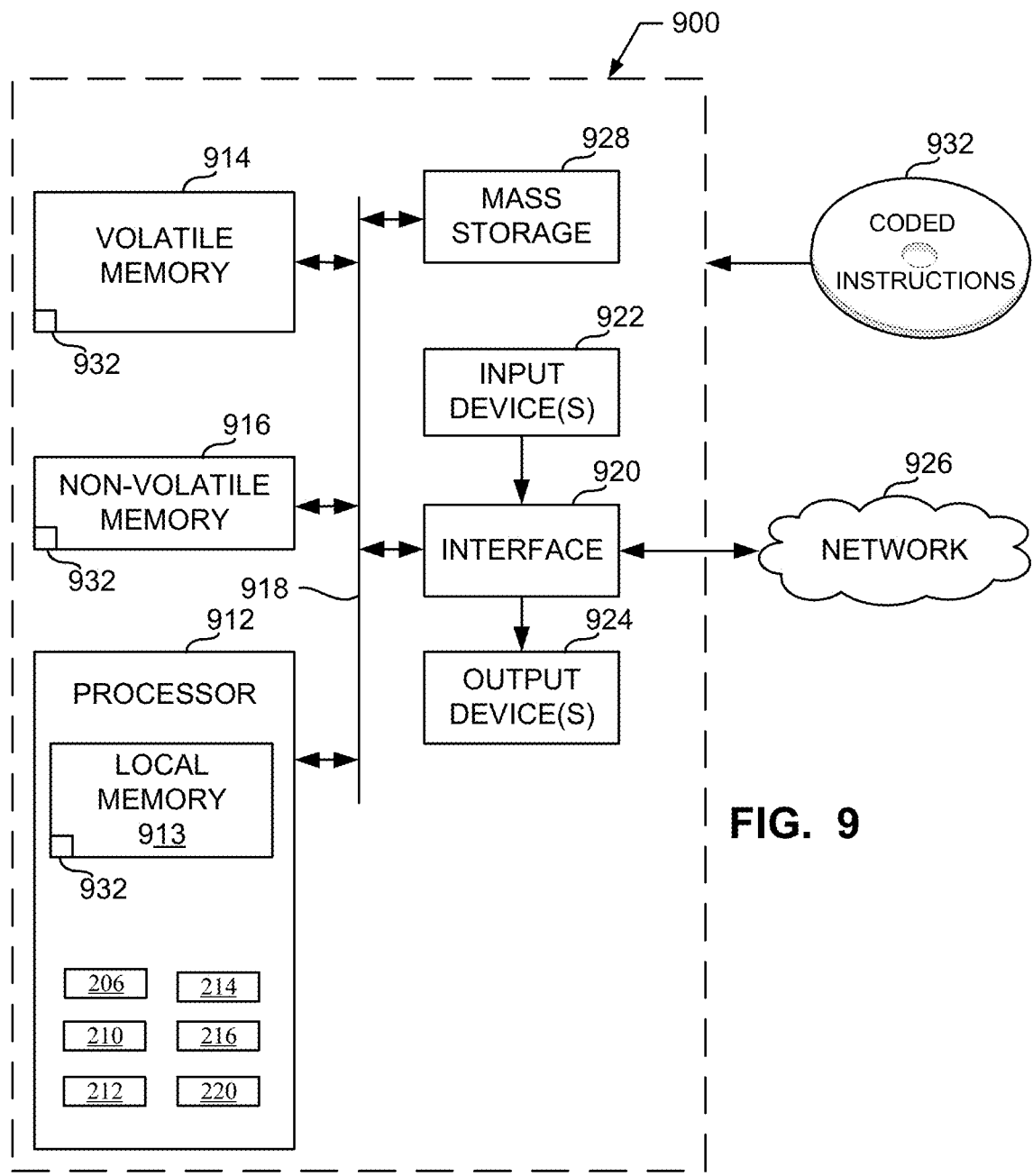
FIG. 9 is a block diagram of an example processing platform structured to execute the instructions of FIG. 5 to implement the example throttling system of FIG. 2.

FIG. 9 is a block diagram of an example processor platform 900 structured to execute the instructions of FIG. 5 to implement the throttling system 200 of FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example power level calculator 206, the example throttle calculator 210, the example throttle controller 212, the example power level converter 214, the example level requester 216 and the example power management unit 220.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 5 may be stored in the mass storage device 928, in the volatile memory 914, in the non-volatile memory 916, and/or on a removable non-transitory computer readable storage medium such as a CD or DVD.

Example 1 includes an apparatus having one or more compute engines to perform calculations, the one or more compute engines to cause a total power request to be issued based on the calculations, and a power management unit to receive the total power request and respond to the total power request. The apparatus also includes a throttle manager to adjust a throttle speed of at least one of the one or more compute engines based on comparing a minimum of the power request and a granted power to a total used power of the one or more compute engines prior to the power management unit responding to the total power request.

Example 2 includes the apparatus as defined in Example 1, further including a power level calculator to calculate the total power request based on first and second power requests of the one or more compute engines, respectively.

Example 3 includes the apparatus as defined in Example 2, wherein the total power request is calculated based on a maximum one of the first and second power requests.

Example 4 includes the apparatus as defined in example 1, wherein the granted power corresponds to a previously issued power grant from the power unit.

Example 5 includes the apparatus as defined in example 1, wherein the throttle manager is to block the total power request if the total power request is less than or equal to the granted power.

Example 6 includes the apparatus as defined in example 1, wherein the throttle manager adjusts the throttle speed by calculating a throttle ratio of the granted power to the total power request.

Example 7 includes the apparatus as defined in example 1, further including a hysteresis analyzer to determine whether to forward the power request to the power management unit based on a degree of similarity between the power request and previous granted powers.

Example 8 includes a non-transitory machine readable medium comprising instructions, which when executed, cause a processor to at least determine that one or more compute engines caused a total power request to be issued to a power management unit, upon determining that the one or more compute engines caused the total power request to be issued, compare a minimum of the total power request and a granted power to a total used power of the one or more compute engines, and adjust, based on the comparison, a throttle speed of at least one of the one or more compute engines prior to the power management unit responding to the total power request.

Example 9 includes the non-transitory machine readable medium as defined in Example 8, wherein the instructions further cause the processor to calculate the total power request based on first and second power requests of the first and second compute cores, respectively.

Example 10 includes the non-transitory machine readable medium as defined in Example 9, wherein the total power request is calculated based on a maximum one of the first and second power requests.

Example 11 includes the non-transitory machine readable medium as defined in Example 8, wherein the instructions further cause the processor to determine the total power request based on a table lookup of associated power levels of the first and second compute engines.

Example 12 includes the non-transitory machine readable medium as defined in Example 8, wherein the instructions further cause the processor to block the total power request if the total power request is less than or equal to the granted power.

Example 13 includes the non-transitory machine readable medium as defined in Example 8, wherein the throttle speed is adjusted by calculating a throttle ratio of the granted power to the power request.

Example 14 includes the non-transitory machine readable medium as defined in Example 8, wherein the instructions further cause the processor to perform a hysteresis analysis to determine whether to forward the power request to the power management unit.

Example 15 includes a method. The method includes determining, by executing an instruction with at least one processor, that one or more compute engines issued a total power request to a power management unit, upon the determination that the one or more compute engines caused the total power request to be issued, comparing, by executing an instruction with the at least one processor, a minimum of the total power request and a granted power to a total used power of the one or more compute engines, and adjusting, by executing an instruction with the at least one processor, a throttle speed of at least one of the one or more compute engines based on the comparison prior to the power management unit responding to the total power request.

Example 16 includes the method as defined in Example 15, further including calculating, by executing an instruction with the at least one processor, the total power request based on first and second power requests of the one or more compute engines, respectively.

Example 17 includes the method as defined in Example 16, wherein the total power request is calculated based on a maximum one of the first and second power requests.

Example 18 includes the method as defined in Example 16, wherein the total power request is calculated based on a table lookup of associated power levels of the one or more compute engines.

Example 19 includes the method as defined in Example 15, further including blocking, by executing an instruction with the at least one processor, the total power request if the total power request is less than or equal to the granted power.

Example 20 includes the method as defined in Example 15, further including adjusting, by executing an instruction with the at least one processor, the throttle speed by calculating a throttle ratio of the granted power to the total power request.

From the foregoing, it will be appreciated that example methods, apparatus and articles of manufacture have been disclosed that enable quick and efficient core speed management of computing cores. The disclosed methods, apparatus and articles of manufacture improve the efficiency of using a computing device by enabling relatively quick adjustment of computing cores and also enabling thermal protection of the computing cores prior to and/or in parallel with management of power level requests. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   one or more compute engines to perform calculations, the one or more compute engines to cause a total power request to be issued based on the calculations;
   a power management unit to receive the total power request and respond to the total power request; and
   a throttle manager to adjust a throttle speed of at least one of the one or more compute engines based on comparing a minimum of the total power request and a granted power to a total used power of the one or more compute engines prior to the power management unit responding to the total power request.

2. The apparatus as defined in claim 1, further including a power level calculator to calculate the total power request based on first and second power requests of the one or more compute engines, respectively.

3. The apparatus as defined in claim 2, wherein the total power request is calculated based on a maximum one of the first and second power requests.

4. The apparatus as defined in claim 1, wherein the granted power corresponds to a previously issued power grant from the power management unit.

5. The apparatus as defined in claim 1, wherein the throttle manager is to block the total power request if the total power request is less than or equal to the granted power.

6. The apparatus as defined in claim 1, wherein the throttle manager adjusts the throttle speed by calculating a throttle ratio of the granted power to the total power request.

7. The apparatus as defined in claim 1, further including a hysteresis analyzer to determine whether to forward the power request to the power management unit based on a degree of similarity between the power request and previous granted powers.

8. A non-transitory machine readable medium comprising instructions, which when executed, cause a processor to at least:
   determine that one or more compute engines caused a total power request to be issued to a power management unit;
   upon determining that the one or more compute engines caused the total power request to be issued, compare a minimum of the total power request and a granted power to a total used power of the one or more compute engines; and
   adjust, based on the comparison, a throttle speed of at least one of the one or more compute engines prior to the power management unit responding to the total power request.

9. The non-transitory machine readable medium as defined in claim 8, wherein the instructions further cause the processor to calculate the total power request based on first and second power requests of the first and second compute engines, respectively.

10. The non-transitory machine readable medium as defined in claim 9, wherein the total power request is calculated based on a maximum one of the first and second power requests.

11. The non-transitory machine readable medium as defined in claim 8, wherein the instructions further cause the processor to determine the total power request based on a table lookup of associated power levels of the first and second compute engines.

12. The non-transitory machine readable medium as defined in claim 8, wherein the instructions further cause the processor to block the total power request if the total power request is less than or equal to the granted power.

13. The non-transitory machine readable medium as defined in claim 8, wherein the throttle speed is adjusted by calculating a throttle ratio of the granted power to the power request.

14. The non-transitory machine readable medium as defined in claim 8, wherein the instructions further cause the processor to perform a hysteresis analysis to determine whether to forward the power request to the power management unit.

15. A method comprising:
- determining, by executing an instruction with at least one processor, that one or more compute engines issued a total power request to a power management unit;
- upon the determination that the one or more compute engines caused the total power request to be issued, comparing, by executing an instruction with the at least one processor, a minimum of the total power request and a granted power to a total used power of the one or more compute engines; and
- adjusting, by executing an instruction with the at least one processor, a throttle speed of at least one of the one or more compute engines based on the comparison prior to the power management unit responding to the total power request.

16. The method as defined in claim 15, further including calculating, by executing an instruction with the at least one processor, the total power request based on first and second power requests of the one or more compute engines, respectively.

17. The method as defined in claim 16, wherein the total power request is calculated based on a maximum one of the first and second power requests.

18. The method as defined in claim 16, wherein the total power request is calculated based on a table lookup of associated power levels of the one or more compute engines.

19. The method as defined in claim 15, further including blocking, by executing an instruction with the at least one processor, the total power request if the total power request is less than or equal to the granted power.

20. The method as defined in claim 15, further including adjusting, by executing an instruction with the at least one processor, the throttle speed by calculating a throttle ratio of the granted power to the total power request.

21. An accelerator comprising:
- at least one memory;
- instructions; and
- at least one processor to execute the instructions to:
  - determine that one or more processor cores caused a total power request to be issued to a power management unit,
  - upon determining that the one or more processor cores caused the total power request to be issued, compare a minimum of the total power request and a granted power to a total used power of the one or more processor cores, and
  - adjust, based on the comparison, a throttle speed of at least one of the one or more processor cores prior to the power management unit responding to the total power request.

* * * * *